United States Patent
Zhang et al.

(10) Patent No.: US 10,468,978 B2
(45) Date of Patent: Nov. 5, 2019

(54) BALANCING TECHNIQUES AND CIRCUITS FOR CHARGE PUMPS

(71) Applicant: Linear Technology Corporation, Milpitas, CA (US)

(72) Inventors: Xu Zhang, Milpitas, CA (US); Jian Li, San Jose, CA (US); San Hwa Chee, San Ramon, CA (US)

(73) Assignee: Linear Technology Corporation, Milpitas, CA (US)

( * ) Notice: Subject to any disclaimer, the term of this patent is extended or adjusted under 35 U.S.C. 154(b) by 0 days.

(21) Appl. No.: 15/465,487

(22) Filed: Mar. 21, 2017

(65) Prior Publication Data

US 2018/0019669 A1     Jan. 18, 2018

Related U.S. Application Data

(60) Provisional application No. 62/363,025, filed on Jul. 15, 2016.

(51) Int. Cl.
*H02M 3/07* (2006.01)
*H02M 1/36* (2007.01)
*H02M 1/08* (2006.01)

(52) U.S. Cl.
CPC .............. *H02M 3/07* (2013.01); *H02M 1/08* (2013.01); *H02M 1/36* (2013.01); *H02M 3/073* (2013.01); *H02M 2003/072* (2013.01)

(58) Field of Classification Search
CPC .................................................. H02M 3/073

(Continued)

(56) References Cited

U.S. PATENT DOCUMENTS

| 5,581,454 A | 12/1996 | Collins |
| 5,598,118 A | 1/1997 | Koifman et al. |

(Continued)

FOREIGN PATENT DOCUMENTS

| CN | 105576964 A | 5/2016 |
| CN | 105634267 A | 6/2016 |

(Continued)

OTHER PUBLICATIONS

U.S. Appl. No. 15/465,339, filed Mar. 21, 2017, Titled: Balancing Charge Pump Circuits.

(Continued)

*Primary Examiner* — William Hernandez
(74) *Attorney, Agent, or Firm* — Schwegman Lundberg & Woessner, P.A.

(57) ABSTRACT

Methods and systems of pre-balancing a switched capacitor converter are provided. A first comparator includes a positive input configured to receive a voltage across an output capacitor and a negative input configured to receive a first hysteresis voltage. A second comparator includes a positive input configured to receive a voltage across an input capacitor of the switched capacitor converter and a negative input configured to receive a second hysteresis voltage. A first current source is coupled between the output capacitor and GND and is configured to discharge the output capacitor upon determining that the voltage across the output capacitor is above a tolerance provided by the first hysteresis voltage. A second current source is coupled between the input capacitor and GND and is configured to discharge the input capacitor upon determining that the voltage across the input capacitor is above a tolerance provided by the second hysteresis voltage.

24 Claims, 11 Drawing Sheets

(58) Field of Classification Search
USPC .................. 327/50, 58, 59, 62, 518, 520
See application file for complete search history.

(56) References Cited

U.S. PATENT DOCUMENTS

| | | | |
|---|---|---|---|
| 5,900,722 | A | 5/1999 | Scott et al. |
| 6,788,039 | B2 | 9/2004 | Abdoulin |
| 7,652,534 | B1 | 1/2010 | Lin |
| 7,696,735 | B2 | 4/2010 | Oraw |
| 7,893,752 | B2 | 2/2011 | Tanaka |
| 8,427,113 | B2 | 4/2013 | Xing |
| 8,503,203 | B1 | 8/2013 | Szczeszynski |
| 8,581,647 | B2 | 11/2013 | Zhong et al. |
| 8,710,903 | B2 | 4/2014 | Oraw et al. |
| 8,724,353 | B1 | 5/2014 | Giuliano |
| 9,484,799 | B2 | 11/2016 | Zhang |
| 9,998,000 | B2 | 6/2018 | Zhang et al. |
| 2004/0004851 | A1 | 1/2004 | Itoh |
| 2006/0087297 | A1 | 4/2006 | Deng |
| 2006/0109205 | A1 | 5/2006 | Deng |
| 2008/0084720 | A1 | 4/2008 | Thiele et al. |
| 2008/0150620 | A1 | 6/2008 | Lesso |
| 2008/0258701 | A1 | 10/2008 | Liu et al. |
| 2009/0072800 | A1 | 3/2009 | Ramadass et al. |
| 2009/0315615 | A1 | 12/2009 | Likhterov |
| 2009/0322384 | A1 | 12/2009 | Oraw et al. |
| 2010/0080023 | A1 | 4/2010 | Jain |
| 2010/0201337 | A1 | 8/2010 | Bradbury |
| 2012/0154013 | A1 | 6/2012 | Mera |
| 2013/0120040 | A1 | 5/2013 | Zhong et al. |
| 2014/0117964 | A1 | 5/2014 | Walters et al. |
| 2014/0306674 | A1 | 10/2014 | Kondou |
| 2014/0327479 | A1 | 11/2014 | Giuliano et al. |
| 2014/0375291 | A1 | 12/2014 | Tomasz et al. |
| 2015/0207401 | A1 | 7/2015 | Zhang et al. |
| 2015/0226556 | A1 | 8/2015 | Aaltonen |
| 2015/0288335 | A1 | 10/2015 | Hyerby |
| 2016/0118905 | A1 | 4/2016 | Freeman et al. |
| 2016/0126851 | A1 | 5/2016 | Freeman et al. |
| 2017/0214318 | A1* | 7/2017 | Takenaka ............ H02M 1/084 |
| 2017/0353105 | A1 | 12/2017 | Solie |
| 2018/0019665 | A1 | 1/2018 | Zhang et al. |
| 2018/0019666 | A1 | 1/2018 | Zhang et al. |
| 2018/0294717 | A1 | 10/2018 | Zhang et al. |
| 2019/0036450 | A1 | 1/2019 | Szczeszynski et al. |

FOREIGN PATENT DOCUMENTS

| | | |
|---|---|---|
| CN | 105656307 A | 6/2016 |
| CN | 105720813 A | 6/2016 |
| CN | 105763040 A | 7/2016 |
| JP | 5951786 B2 | 6/2016 |
| TW | 200608674 A | 3/2006 |
| TW | 200844704 A | 11/2008 |
| TW | 201345132 A | 11/2013 |
| TW | 201428444 A | 7/2014 |
| TW | 201530998 A | 8/2015 |
| TW | I660567 B | 5/2019 |
| WO | WO-2012054736 A2 | 4/2012 |
| WO | WO-2012132439 A1 | 10/2012 |
| WO | WO-2016105905 A1 | 6/2016 |
| WO | WO-2018013183 A1 | 1/2018 |
| WO | WO-2018013184 A1 | 1/2018 |
| WO | WO-2018013185 A1 | 1/2018 |

OTHER PUBLICATIONS

U.S. Appl. No. 15/465,504, filed Mar. 21, 2017, Titled: Driving Charge Pump Circuits.

PCT/US17/23466, International Search Report and Written Opinion, dated Jun. 21, 2017, 9 pages.

PCT/US17/23468, International Search Report and Written Opinion, dated Jun. 16, 2017, 8 pages.

PCT/US17/23469, International Search Report and Written Opinion, dated Jun. 12, 2017, 9 pages.

"U.S. Appl. No. 15/465,339, Notice of Allowance dated Feb. 14, 2018", 9 pgs.

"U.S. Appl. No. 15/465,504, 312 Amendment filed Jul. 19, 2018", 11 pgs.

"U.S. Appl. No. 15/465,504, Amendment filed Jul. 25, 2018", 12 pgs.

"U.S. Appl. No. 15/465,504, Examiner Interview Summary dated Mar. 22, 2018", 3 pgs.

"U.S. Appl. No. 15/465,504, Non Final Office Action dated Dec. 28, 2017", 12 pgs.

"U.S. Appl. No. 15/465,504, Notice of Allowance dated May 4, 2018", 7 pgs.

"U.S. Appl. No. 15/465,504, Notice of Allowance dated Nov. 13, 2018", 7 pgs.

"U.S. Appl. No. 15/465,504, Notice of Non-Compliant Amendment dated Aug. 7, 2018", 3 pgs.

"U.S. Appl. No. 15/465,504, Preliminary Amendment filed Sep. 13, 2018", 11 pgs.

"U.S. Appl. No. 15/465,504, Response filed Mar. 18, 2018 to Non Final Office Action dated Dec. 28, 2017", 11 pgs.

"U.S. Appl. No. 16/005,594, Non Final Office Action dated Oct. 12, 2018", 11 pgs.

"U.S. Appl. No. 16/005,594, Preliminary Amendment filed Jun. 11, 2018", 10 pgs.

"Balancing Tectmiques and Circuits for Charge Pumps", U.S. Appl. No. 15/465,487, filed Mar. 21, 2017.

"Taiwanese Application Serial No. 106116577, Office Action dated Oct. 16, 2018", 7 pgs.

"Taiwanese Application Serial No. 106116594, Office Action dated Aug. 29, 2018", W/English Translation, 18 pgs.

"U.S. Appl. No. 15/465,504, Non Final Office Action dated Mar. 14, 2019", 5 pgs.

"U.S. Appl. No. 15/465,504, Response filed Jan. 24, 2019 to Notice of Allowance dated Nov. 13, 2018", 11 pgs.

"U.S. Appl. No. 16/005,594, Final Office Action dated Mar. 12, 2019", 8 pgs.

"U.S. Appl. No. 16/005,594, Response filed Jan. 14, 2019 to Non Final Office Action dated Oct. 12, 2018", 11 pgs.

"International Application Serial No. PCT/US2017/023469, International Preliminary Report on Patentability dated Jan. 24, 2019", 8 pgs.

"Taiwanese Application Serial No. 106116577, Response Filed Jan. 14, 2019 to Office Action dated Oct. 16, 2018", w/English Claims, 76 pgs.

"Taiwanese Application Serial No. 106116593, Office Action dated Jan. 3, 2019", w/ English Translation, 20 pgs.

"U.S. Appl. No. 15/465,504, Notice of Allowance dated Jun. 10, 2019", 9 pgs.

"U.S. Appl. No. 16/005,594, Advisory Action dated Jun. 10, 2019", 3 pgs.

"U.S. Appl. No. 16/005,594, Response filed May 28, 2019 to Final Office Action dated Mar. 12, 2019", 10 pgs.

"European Application Serial No. 17828092.1, Response Filed Jun. 27, 2019 to Communication Pursuant to Rules 161(2) and 162 EPC dated Feb. 22, 2019", w/ English Claims, 14 pgs.

"European Application Serial No. 17828093.9, Response filed Jun. 27, 2019 to Communication pursuant to Rules 161(2) and 162 EPC dated Feb. 22, 2019", w/ English Claims, 16 pgs.

* cited by examiner

BALANCING TECHNIQUES AND CIRCUITS FOR CHARGE PUMPS

CROSS-REFERENCE TO RELATED APPLICATION

The present application claims the benefit of priority under 35 U.S.C. § 119 from U.S. Provisional Patent Application Ser. No. 62/363,025 entitled "Balancing and Driving Charge Pump Circuits," filed on Jul. 15, 2016, which is hereby incorporated by reference in its entirety for all purposes.

BACKGROUND

Technical Field

This disclosure generally relates to voltage converters. More particularly, the present disclosure relates to switched capacitor converter circuits that are more reliable.

Description of Related Art

A charge pump circuit is a type of switched capacitor circuit that may be used to convert a direct current (DC) input voltage to another DC voltage. A charge pump can be configured to generate an output voltage that is a multiple (e.g., 2, 3 . . . N times) the input voltage or it can set an output voltage that is a fraction thereof (e.g., ½, ⅓ . . . 1/N times of the input voltage). In some implementations, such circuit can also generate a negative output voltage from a positive input voltage. Since the charge pump circuit does not require inductors to do the voltage conversion, it is sometimes referred as an inductor-less DC/DC converter.

FIG. 1A illustrates a conventional switched capacitor converter circuit 100. In the example of FIG. 1A, the input voltage approximately equals 2 times the output voltage at steady state. In the example of FIG. 1A, the transistors, which by way of example only and not by way of limitation, are illustrated to be metal oxide semiconductor field effect transistors (MOSFETs) Q1 and Q3 (106 and 110), are turned ON and OFF in a way that is complimentary to transistors Q2 and Q4 (108 and 112), as illustrated in FIG. 1B. The transistors are shown to switch at around 50% duty cycle. As illustrated in FIG. 1B, during steady state operation, the transistors Q1-Q4 (106 to 112) are switched to cyclically charge and discharge capacitor 104, sometimes referred to as a flying capacitor $C_{FLY}$. By adding feedback to the circuit 100, transistors Q1 and Q4 (106 and 112) can be driven differently to generate an output voltage $V_{OUT}$ other than $V_{IN}/2$. For example, different duty ratios may be used to provide the flexibility of providing output voltages that are different factors (e.g., 0.75, 0.5, 0.25, etc.) of the input voltage. Also, swapping the input and output nodes $V_{IN}$ and $V_{OUT}$, respectively, the output voltage may be a multiple of the input voltage. For simplicity, as used herein, the term "factor" includes the meaning of fraction and multiple.

In the example of FIG. 1A, when transistors Q1 106 and Q3 110 are ON, capacitors $C_{FLY}$ 104 and $C_{OUT}$ 114 are effectively connected in series, thereby charging $C_{FLY}$ 104 and $C_{OUT}$ 114 to approximately $V_{IN}/2$. The capacitors $C_{FLY}$ 104 and $C_{OUT}$ 114 are initially charged by the input voltage $V_{IN}$ at start-up, where the voltage across the nodes of $C_{FLY}$ 104 and $C_{OUT}$ 114 is at $V_{IN}/2$. Typically, capacitors are connected external to any controller package due to their large size. The switches Q1-Q4 (106 to 112) may also be external to the package to accommodate higher currents. The input voltage VIN 102 is directly connected to the top terminal of the transistor Q1 (106), where capacitor—$C_{FLY}$ 104 is connected to VIN 102 via transistor Q1 (106) when it is ON.

When the transistors Q2 108 and Q4 112 are ON, the capacitors $C_{FLY}$ 104 and $C_{OUT}$ 114 are in parallel. This arrangement forces the voltages across capacitors $C_{FLY}$ 104 and $C_{OUT}$ 114 to be substantially similar at approximately $V_{IN}/2$.

Charge pump circuits, similar to the switched capacitor converter circuit 100, may be subject to a large inrush current to sensitive circuit elements, such as transistors Q1 to Q4 (106 to 112). For example, the initial voltage across the capacitors, $C_{FLY}$ 104 and $C_{OUT}$ 114 may not be equal to $V_{IN}/2$ during startup or due to the presence of a fault condition during operation, collectively referred to herein as a transient state. In various scenarios, a fault condition may arise, for example, when a capacitor, such as $C_{OUT}$ 114, becomes a short circuit. Since there is no inductor in the switched capacitor converter circuit 100 to limit current, the input inrush current can rise quickly to a high level. In high current applications, this huge inrush current is exacerbated since very low ON-resistance MOSFETs may be used to implement transistors Q1 to Q4 (106 to 112) to achieve high power efficiency.

FIG. 1C is an example scenario that illustrates how, upon the $V_{IN}$ power supply powering up at time T0 (e.g., when the capacitors $C_{FLY}$ 104-$C_{OUT}$ 114 have a zero initial voltage), the in-rush current 130 may exceed 1000 A, depending on parasitic resistances in the path. The high current may last for a short time (e.g., less than 1 microsecond) but can nonetheless exceed the transistors' 106 to 112 safe operating current, thereby affecting the reliability of the switched capacitor converter circuit 100 in general, and the transistors 106 to 112 in particular. The output voltage $V_{OUT}$ reaches its steady state voltage after the capacitors $C_{FLY}$ 104 and $C_{OUT}$ 114 are fully charged and the switches Q1-Q4 (106 to 112) are controlled, as illustrated in the context of FIG. 1B. Further, there may be ringing 132 at the output voltage node $V_{OUT}$ after the inrush current, as illustrated in FIG. 1C, which may affect the load 116. During transient state (e.g., power-up or a fault condition), the voltages on the chip are not predictable because the voltages may not have been fully developed.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings. Some embodiments may be practiced with additional components or steps and/or without all of the components or steps that are described.

The various methods and circuits disclosed herein generally relate to methods and circuits of providing fault protection for switched capacitor voltage converters. Both multiplying and dividing switched capacitor voltage converters are controlled by various pre-balance circuits such that large inrush currents are prevented, thereby providing a reliable operation of the switched capacitor voltage converters. In one aspect, circuit and method of driving a switched capacitor converter having a plurality of switches is provided. Since an upper driver is supplied by a lower driver, only when the lower driver is ready, are the upper driver capacitors charged, respectively. In this way, the switches of a switched capacitor converter circuit can be controlled in a reliable way even in transient state.

Figures 1A, 1B:
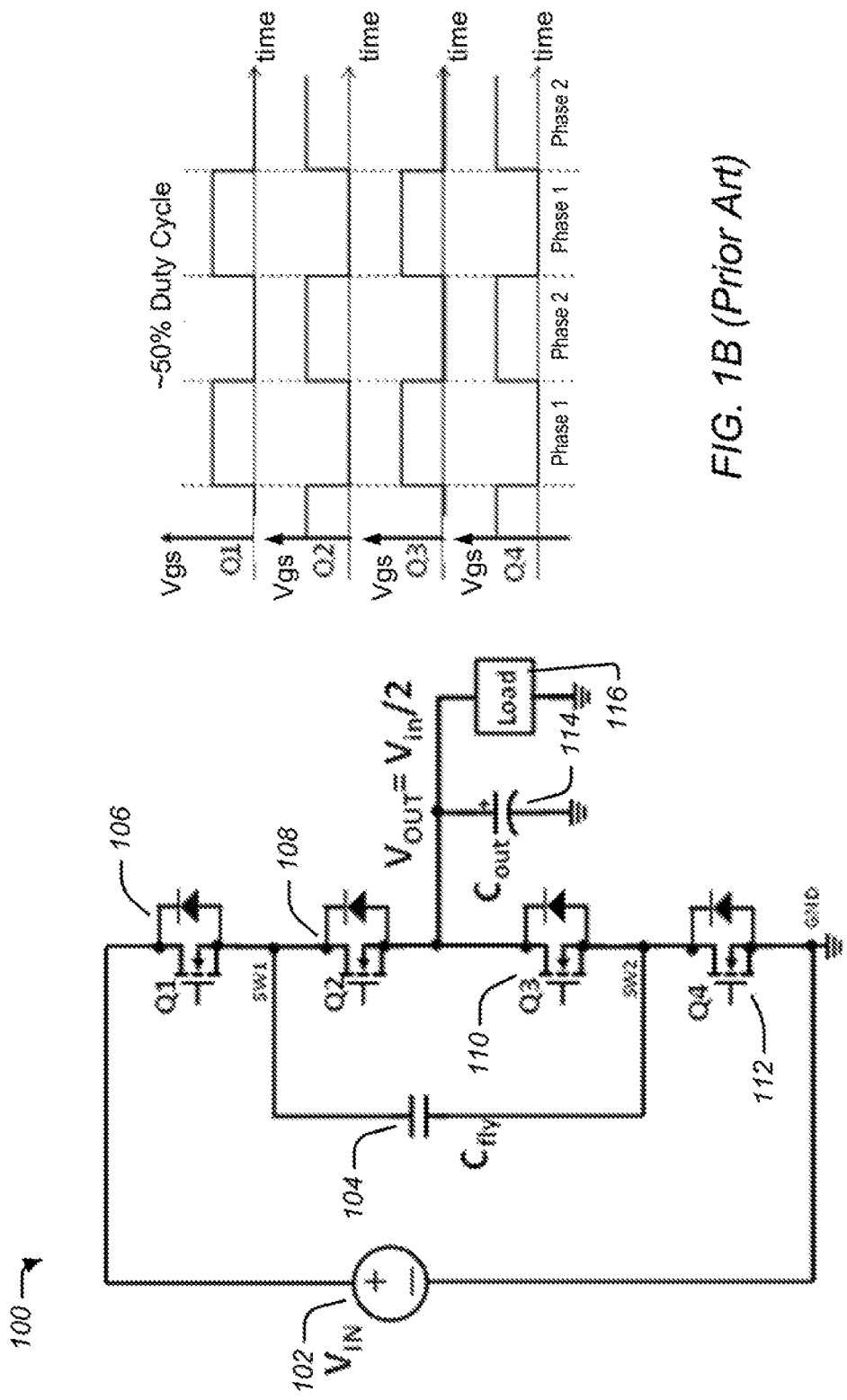
FIG. 1A illustrates a conventional switched capacitor converter circuit.
FIG. 1B illustrates example gate driver input waveforms of the transistors of the circuit of FIG. 1A.
Figure 1C:
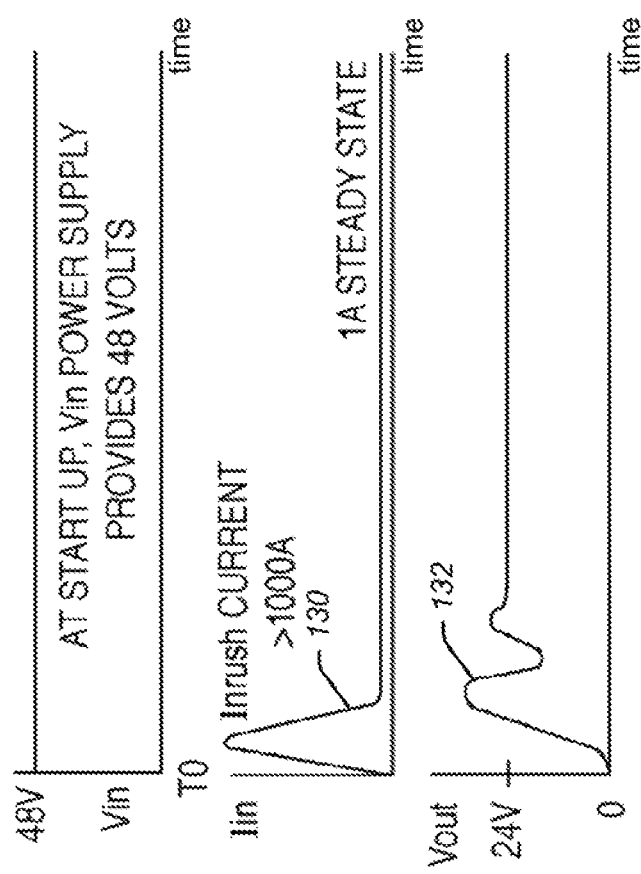
FIG. 1C illustrates example waveforms during a startup of the circuit of FIG. 1A.
Figure 2:
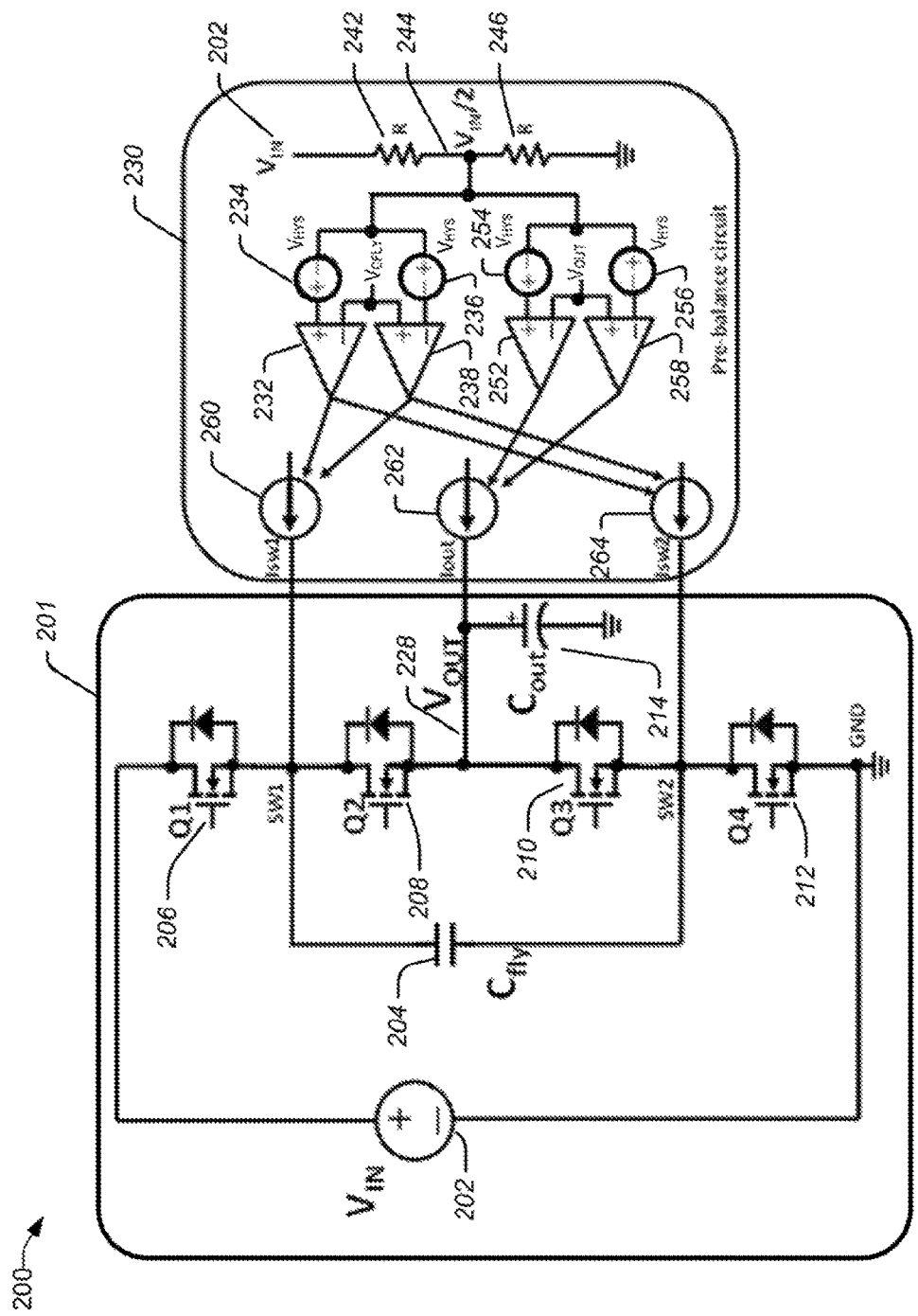
FIG. 2 is a switched capacitor converter circuit that is coupled to a pre-balance circuit, consistent with an illustrative embodiment.

FIG. 2 illustrates a switched capacitor converter circuit 201 that is coupled to a pre-balance circuit 230, consistent with an illustrative embodiment. The components of the switched capacitor converter circuit 201 are similar to those of FIG. 1A and are therefore not repeated here for brevity. The current through the transistors Q1 to Q4 (206 to 212) when the transistors Q1 to Q4 operates in the triode region and the capacitors $C_{FLY}$ 204 and $C_{OUT}$ 214 can be approximated by the equations below for both phases of operation:

Phase 1, $I=(V_{IN}-V_{CFLY}(t)-V_{COUT}(t))/(R_{ON\_Q1}+R_{ON\_Q3})$ (EQ. 1)

Phase 2, $I=(V_{CFLY}(t)-V_{COUT}(t))/(R_{ON\_Q2}+R_{ON\_Q4})$ (EQ. 2)

Where:
Phase 1 is when transistors Q1 and Q3 are ON, and Q2 and Q4 are OFF,

Phase 2 is when transistors Q2 and Q4 are ON, and Q1 and Q3 are OFF,

I is the current through a transistor that is ON, $R_{ON}$ is the drain to source resistance of a transistor when it is ON, $V_{CFLY}(t)$ is the voltage across the $C_{FLY}$ at time t, and $V_{COUT}(t)$ is the voltage across the $C_{OUT}$ at time t.

The drain to source resistance $R_{ON}$ of each transistor Q1 to Q4 (206 to 212) may have a very low ON resistance for better power efficiency. The lower the $R_{ON}$ of the corresponding transistor, the larger the inrush current may be, thereby providing a potential threat to the reliability of the switched capacitor converter circuit.

Applicants have identified that in view of equations 1 and 2 above, that if the voltages of capacitors $C_{FLY}$ 204 and $C_{OUT}$ 214 are controlled by the manner disclosed herein, the inrush current can be minimized. For example, if the following two conditions of equations 3 and 4 are met, then the inrush current is zero:

Condition 1: $V_{CFLY}(t=0)=V_{COUT}(t=0)$ (EQ. 3)

Condition 2: $V_{IN}=V_{CFLY}(t=0)+V_{COUT}(t=0)$ (EQ. 4)

In various embodiments, the inrush current can be limited to different pre-determined values based on the transistors' Q1 to Q4 (206 to 212) safety operation range. For example, different types of transistors have different tolerances for proper operation that does not lead to a premature reliability degradation of the transistor.

In one embodiment, assuming that the ON-resistance $R_{ON}$ of the transistors Q1 to Q4 (206 to 212) is the same and if the transistor (e.g., MOSFET) maximum safety current is $I_{MAX}$, equations 5 and 6 can provide conditions for safe operation of the capacitor converter circuit 201.

$V_{IN}/2-2R_{ON}*I_{max}<V_{CFLY}(t=0)<V_{IN}/2+2R_{ON}*I_{max}$ (EQ. 5)

$V_{IN}/2-2R_{ON}*I_{max}<V_{COUT}(t=0)<V_{IN}/2+2R_{ON}*I_{max}$ (EQ. 6)

Where:
$2R_{ON}*I_{max}$ is the pre-determined offset voltage $V_{HYS}$.

Hysteresis and the corresponding offset voltage is discussed in more detail later. The pre-balance circuit 230 is configured to pre-balance the voltage across capacitors $C_{FLY}$ 204 and $C_{OUT}$ 214 such that the conditions of equations 5 and 6 above are met when the switched capacitor converter circuit 201 is operative as a voltage divider charge pump. The pre-balancing of the pre-balancing circuit 230 may be performed during power-up or re-startup of the switched capacitor converter circuit 201.

In the example of FIG. 2, the pre-balance circuit includes three current sources 260, 262, and 264, which can sink or source current to nodes SW1, $V_{OUT}$ 228, and SW2, respectively. The pre-balance circuit 230 includes a voltage divider, comprising a first resistance element 242 and a second resistance element 246 connected in series. The ratio of the first resistance element 242 to the second resistance element 246 may differ based on the voltage division to be achieved by the switched capacitor converter circuit 201. For example, for a divide by two charge pump configuration, the first resistance element 242 and the second resistance element 246 may be equal in resistance such that a voltage of $V_{IN}/2$ is provided at the voltage divider node 244. The voltage divider is configured to sample the input voltage $V_{IN}$ 202 and provide a scaled version thereof at node 244. The voltage at node 244 is used as a reference voltage for various components of the pre-balance circuit 230.

The pre-balance circuit includes a pair of comparators 232 and 238 configured to compare the voltage across the capacitor $C_{FLY}$ 204 with the reference voltage of node 244. In various embodiments, hysteresis may be added in order to provide a tolerance range for the comparators 232 and 238. To that end, a first hysteresis voltage source $V_{HYS}$ 234 provides a first hysteresis voltage $V_{HYS}$ to an input terminal of the first comparator 234. Similarly, a second hysteresis voltage source $V_{HYS}$ 236 is added to an input terminal of the second comparator 238. In various embodiments, the first hysteresis voltage may be equal in magnitude to the second hysteresis voltage or may be different, depending on the desired hysteresis tolerance range to be implemented for the pre-balance circuit 230. Put differently, the hysteresis voltage sources 234 and 236 provide threshold levels that, when exceeded, may trigger corrective action to pre-balance a switched capacitor converter circuit 201.

If the $V_{CFLY}$ voltage is out of a predetermined tolerance defined by the hysteresis voltage sources 234 and 236, then the pair of comparators 232 and 238 activate the first current source to provide a current to charge or sink the capacitor $C_{FLY}$ 204 and activate the second current source to draw or source current to the capacitor $C_{FLY}$ 204 such that the voltage across the capacitor $C_{FLY}$ 204 is controlled to be within the tolerance range discussed above.

The pre-balance circuit may also include a second pair of comparators 252 and 258 together providing a second comparator circuit that is configured to compare the voltage across capacitor $C_{OUT}$ 214 (i.e., the output voltage $V_{OUT}$ at node 228) with the reference voltage of node 244. Similar to the first pair of comparators 232 and 238 (i.e., the first comparator circuit), hysteresis may be added in order to provide a tolerance range for the comparators 252 and 258. To that end, a third hysteresis voltage source $V_{HYS}$ 254 provides a third hysteresis voltage $V_{HYS}$ to an input terminal of the first comparator $V_{HYS}$ 252. Similarly, a fourth hysteresis voltage source $V_{HYS}$ 256 provides a hysteresis voltage to a terminal of the comparator 258. In various embodiments, the third hysteresis voltage may be equal in magnitude to the fourth hysteresis voltage or may be different, depending on the desired hysteresis tolerance range to be implemented for the voltage across the output capacitance $C_{OUT}$ 214 of the pre-balance circuit 230.

If the $V_{OUT}$ voltage is out of a predetermined tolerance defined by the hysteresis voltage sources 254 and 256, then the second pair of comparators 252 and 258 activate the second current source to provide or sink current to adjust (e.g., charge/discharge) the output capacitor $C_{OUT}$ 214 such that the voltage across the output capacitor $C_{OUT}$ 214 is controlled to be within the tolerance range defined by the hysteresis voltage sources 254 and 256.

In one embodiment, during a capacitor voltage pre-balance phase, the transistors Q1 to Q4 (206 to 212) remain OFF and each current source 260, 262, and or 264 draws or sources current to nodes sw1, sw2, and $V_{OUT}$ based on the sensed voltage across the capacitors $C_{FLY}$ 204 and $C_{OUT}$ 214. The following equations provide conditions and polarity of each current source, respectively.

For current source $I_{OUT}$ 262:

$$V_{OUT} > (V_{IN}/2 + V_{HYS}) \quad \text{(EQ. 7)}$$

Where: $I_{OUT}$ draws current from node $V_{OUT}$ 228.

$$(V_{IN}/2 - V_{HYS}) < V_{OUT} < (V_{IN}/2 + V_{HYS}) \quad \text{(EQ. 8)}$$

Where: $I_{OUT}$ is turned OFF.

$$V_{OUT} < (V_{IN}/2 - V_{HYS}) \quad \text{(EQ. 9)}$$

Where: $I_{OUT}$ provides current to node $V_{OUT}$ 228.

For current sources $I_{SW1}$ 260 and $I_{SW2}$ 264:

$$V_{CFLY} > (V_{IN}/2 + V_{HYS}) \quad \text{(EQ. 10)}$$

Where: $I_{SW1}$ draws current from node SW1 and $I_{SW2}$ provides current to node SW2.

$$(V_{IN}/2 - V_{hys}) < V_{CFLY} < (V_{IN}/2 + V_{hys}) \quad \text{(EQ. 11)}$$

Where: $I_{SW1}$ and $I_{SW2}$ are OFF.

$$V_{CFLY} < (V_{IN}/2 - V_{hys}) \quad \text{(EQ. 12)}$$

Where: $I_{SW1}$ provides current to node SW1 and $I_{SW2}$ draws current from node SW2.

Figure 3:
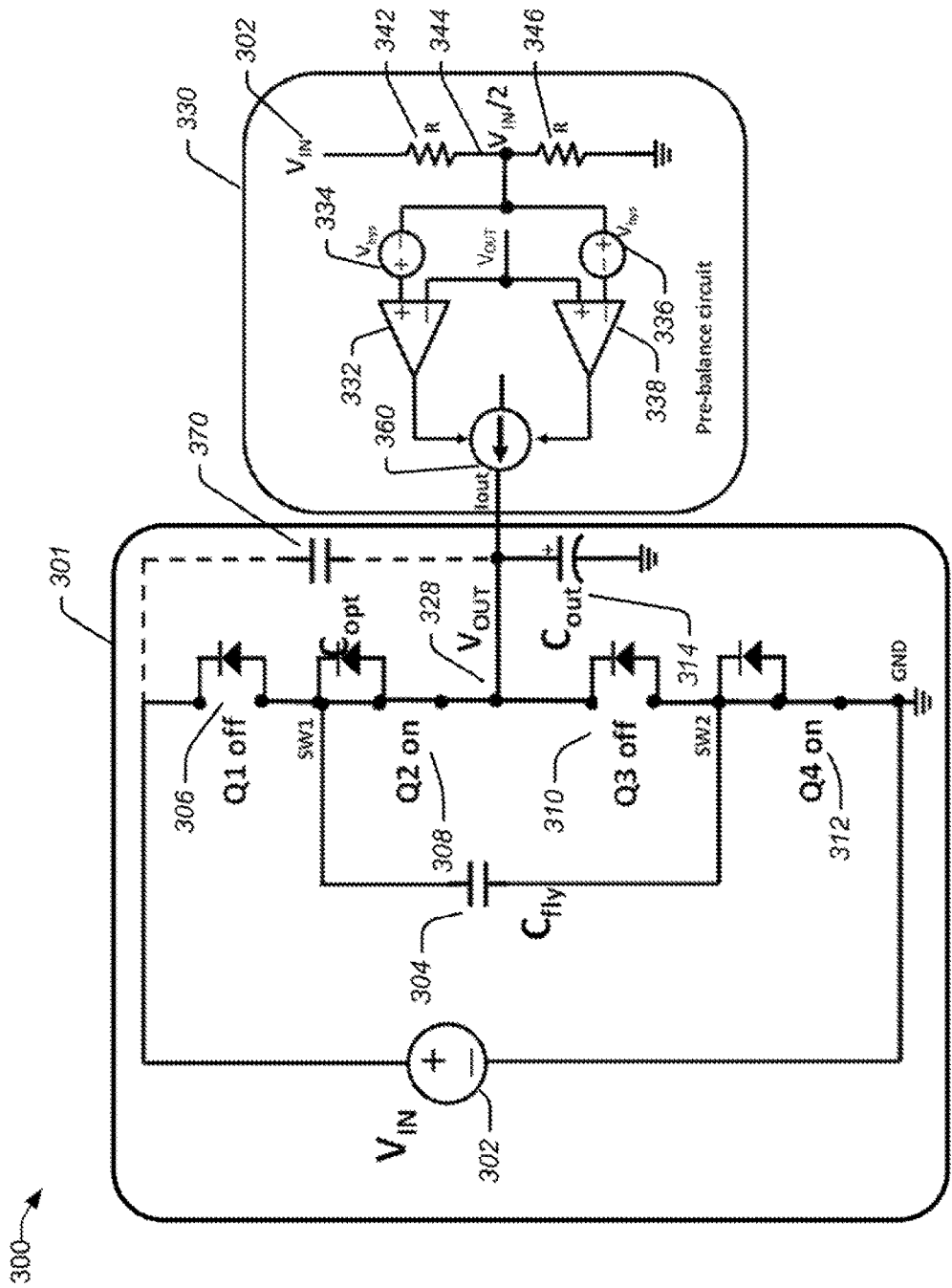
FIG. 3 is a switched capacitor converter circuit that is coupled to a pre-balance circuit, consistent with another illustrative embodiment.

Reference now is made to FIG. 3, which is a switched capacitor converter circuit 301 that is coupled to a pre-balance circuit 330, consistent with another illustrative embodiment. The components of the switched capacitor converter circuit 301 are similar to those of the switched capacitor converter circuit 201 and are therefore not discussed in substantial detail. In one embodiment, the switched capacitor converter circuit 301 may include an additional output capacitor $C_{OPT}$ 370 coupled between a terminal of the input voltage $V_{IN}$ 302 and the output capacitor $C_{OUT}$ 314 for better charge sharing and efficiency. As used herein, the term efficiency relates to the amount of input power is used to get a certain amount of power. For example, for a 100% efficient system, there are no losses and the input power used is the same as the output power. The capacitor $C_{opt}$ 370 provides an additional path in transferring charge to the output capacitor $C_{OUT}$, thereby reducing the amount of current flowing through the transistors. As a capacitor has lower effective resistance than the power transistors, it therefore has lower losses.

When the switched capacitor converter circuit 301 is configured to be operated as a voltage divider charge pump, as illustrated in FIG. 3, the pre-balance circuit can be further simplified. For example, pre-balance circuit 330 may use a single current source 360 to charge or discharge the two capacitors $C_{FLY}$ 304 and $C_{OUT}$ 328 at the same time.

The pre-balance circuit 330 includes a voltage divider comprising a first resistance element 342 and a second resistance element 346 connected in series. The ratio of the first resistance element 342 to the second resistance element 346 may differ based on the voltage division to be achieved by the switched capacitor converter circuit 301. The voltage divider is configured to sample the input voltage $V_{IN}$ 302 and provide a scaled version thereof at node 344.

The pre-balance circuit 330 also includes a pair of comparators 332 and 338 that are configured to compare the voltage across the capacitor $C_{OUT}$ 314 with the reference voltage of the node 344. The operation of the pair of comparators 332 and 338 is similar to that of comparators 252 and 258 of FIG. 2 and is therefore not discussed in detail for brevity.

The pre-balance circuit 330 is able to perform the pre-balancing without the use of the additional circuitry of the pre-balance circuit 230 of FIG. 2, by virtue of a specific timing of activation and deactivation of the transistors Q1 to Q4 (306 to 312) during a capacitor ($C_{OUT}$) voltage pre-balance phase. For example, during such phase, transistors Q2 and Q4 (308 and 312) are turned ON (represented by shorted wires) while transistors Q1 and Q3 (306 and 310) are turned OFF (represented by gaps and a drain to source diode connection), as illustrated in FIG. 3.

Before turning ON transistors Q2 308 and Q4 312, the node SW1 is pulled to a level substantially similar to $V_{OUT}$ 328, and the node SW2 is pulled down to a level substantially similar to GND. In one embodiment, two current sources may be used to pull the node SW1 to GND and the node SW2 to GND separately, or two resistance elements may be connected from node SW1 to GND and node SW2 to GND separately to pull these two nodes down. When transistors Q2 308 and Q4 312 are then turned ON, capacitors $C_{FLY}$ 304 and $C_{OUT}$ 314 are connected in parallel and the voltage across them is the same. The pre-balance circuit 330 charges or discharges the capacitors $C_{FLY}$ 304 and $C_{OUT}$ 314 simultaneously if the voltage sensed across the output capacitor $C_{OUT}$ 314 is not within a predetermined tolerance, as defined by the hysteresis voltage sources 334 and 336. Alternately, if $C_{FLY}$ 304 is not required to be balanced as precise as capacitor $C_{OUT}$ 314, the pre-balance may be done with only transistor Q4 312 being ON (while transistor Q2 308 is OFF) for simplicity. In such a scenario, the capacitor $C_{FLY}$ 304 may be charged up by the pre-balance circuit 330 through the body diode of Q2. The voltage on the $C_{FLY}$ capacitor 304 is one diode voltage drop (e.g., approximately 0.7V) lower than the voltage on the output capacitor $C_{OUT}$ 314.

Figure 4A:
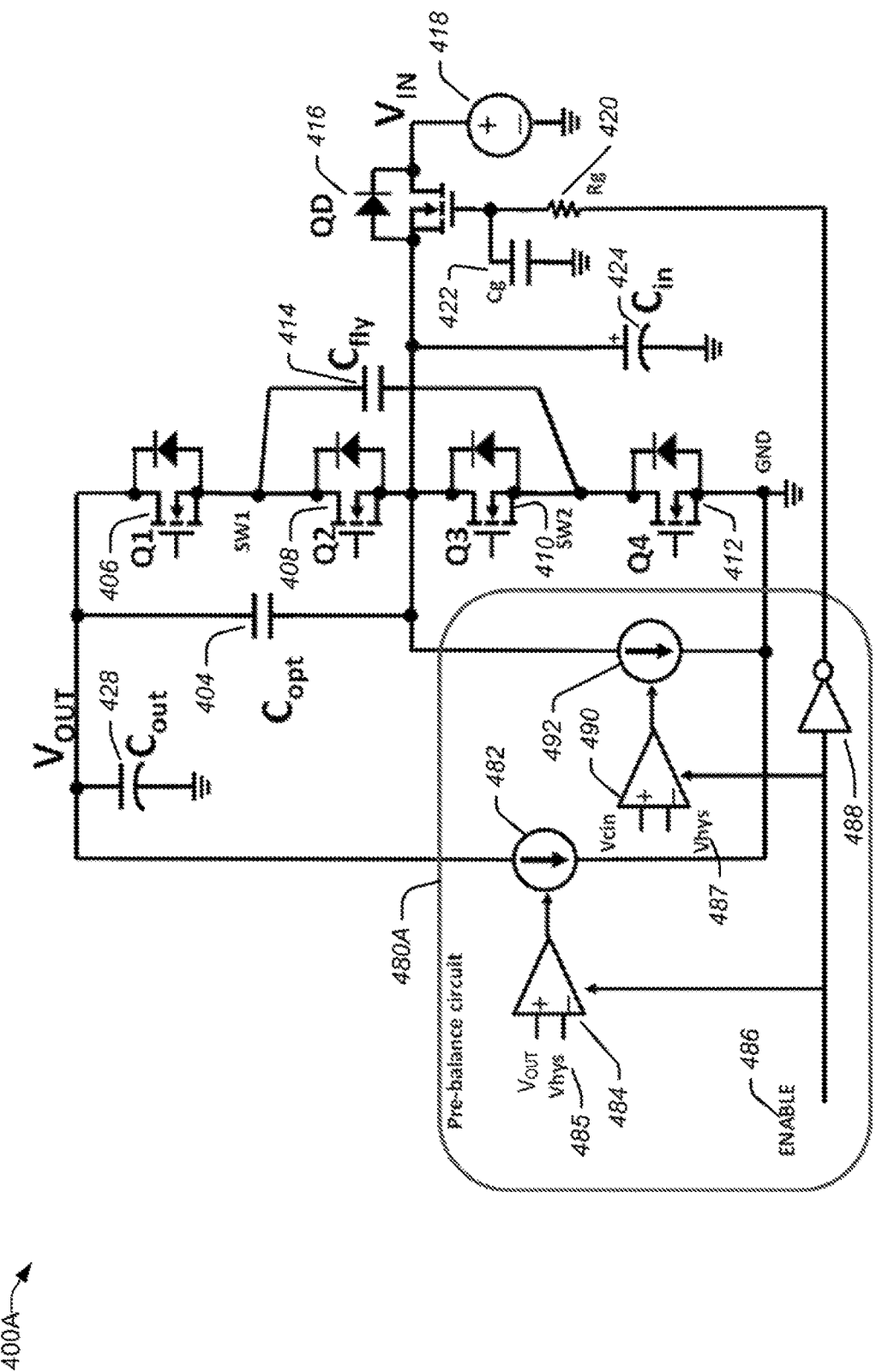
FIG. 4A is a switched capacitor converter circuit configured as a multiplier that is coupled to a pre-balance circuit, consistent with an illustrative embodiment.

Reference now is made to FIG. 4A, which is a switched capacitor converter circuit configured as a multiplier that is coupled to a pre-balance circuit 480A, consistent with an illustrative embodiment. Although the pre-balancing circuit 230 of FIG. 2 could be used to pre-balance the switched capacitor converter circuit, the pre-balance circuit 440 of FIG. 4A provides an example implementation that is simpler in many ways. The switched capacitor converter circuit portion of the architecture 400A includes the components that are outside those of the pre-balance circuit 480A, which are configured in a voltage multiplier (e.g., doubler) configuration.

There are four transistors Q1 to Q4 (406 to 412) connected in series between $V_{OUT}$ and GND potential. There is an input capacitor $C_{IN}$ 424 having its first node coupled at the second terminal (e.g., source) of the transistor Q2 408 (also the first terminal of the transistor Q3 (e.g., drain)) and its second node coupled to GND potential. There is a flying capacitor $C_{FLY}$ 414 coupled between a first terminal of transistor Q2 408 and the second terminal of transistor Q3. There is an output capacitor $C_{OUT}$ 428 coupled between $V_{OUT}$ and GND. In one embodiment, there is a third capacitor $C_{OPT}$ 404 for better charge sharing and efficiency.

The pre-balance circuit 480A includes two separate current sources 482 and 492 that are operative to control the charge of the output node $V_{OUT}$ (across capacitor $C_{OUT}$ 428) and the voltage across $C_{IN}$ 424, respectively. Each current source 482, and 492 is controlled by its corresponding comparator 484 and 490, respectively. Comparator 484 compares the voltage at the output node (i.e., across $C_{OUT}$ 428) to a first hysteresis voltage $V_{HYS}$ 485. For example, when the voltage across $C_{OUT}$ 428 exceeds the tolerance provided by the hysteresis voltage $V_{HYS}$ 485, then the comparator 484 triggers the current source 482 to reduce the charge across $C_{OUT}$ 428. In this way, the output voltage (i.e., voltage across $C_{OUT}$ 428) is maintained within a predetermined tolerance. The actual current of each current source 482 and 492 is chosen to prevent large inrush from or to the transistors Q1 to Q4 (406 to 412) to prevent reliability degradation of the same.

Similarly, the voltage across capacitor $C_{IN}$ 424 is maintained by the current source 492. The comparator 490 compares the voltage across the input capacitor $C_{IN}$ 424 to a second hysteresis voltage $V_{HYS}$ 487. In one embodiment, the second hysteresis voltage 487 is identical to that of the first hysteresis voltage 485. When the voltage across the input capacitor $C_{IN}$ 424 exceeds the tolerance provided by the second hysteresis voltage $V_{HYS}$ 487, then the comparator 490 triggers the current source 492 to reduce the charge across capacitor $C_{IN}$ 424, thereby maintaining the voltage across $C_{IN}$ 424 within a predetermined tolerance.

In one embodiment, the pre-balance circuit 480A is used when the $V_{IN}$ supply 418 is a ramp (e.g., instead of a step function). Such scenario may exist, for example, when the $V_{IN}$ supply 418 is provided by a switching regulator that has soft start feature and is turned ON after the pre-balance phase has finished.

Alternatively, or in addition, a switch, such as an N-channel metal oxide field effect transistor (NFET) 416 connected in series to the supply $V_{IN}$ 418, can be slowly turned ON to create a ramped voltage input to the charge pump. For example, instead of pre-biasing the capacitors $C_{OUT}$ 428, $C_{FLY}$ 414, $C_{IN}$ 424, (and $C_{OPT}$ 404 if available) to a voltage level $V_{IN}/2$, these capacitors are discharged to a voltage value lower than the hysteresis voltage $V_{HYS}$ 485 while the transistor QD 416, sometimes referred herein as the input "disconnect" switch, is OFF during a pre-balance phase.

It should be noted that the capacitor $C_{FLY}$ 414 is not discharged directly; rather, capacitors $C_{IN}$ 424 and $C_{OUT}$ 428 are discharged by current sources 482 and 492, respectively. That is because flying capacitor $C_{FLY}$ 414 is coupled between the first terminal of the transistor Q2 408 and the second terminal of transistor Q3 410, which effectively have body diodes between each drain to source, thereby providing a path for capacitor $C_{FLY}$ 414 to discharge. While a similar effect could be achieved by turning ON transistors Q2 408 and Q1 406, during transient state (e.g., power up) the voltages controlling the gates of transistors may not be predictable. Thus, during transient state, the effective diode of each transistor Q1 to Q4 (406 to 412) is a more reliable way of assuring the $C_{FLY}$ capacitor 414 is discharged.

Figure 4B:
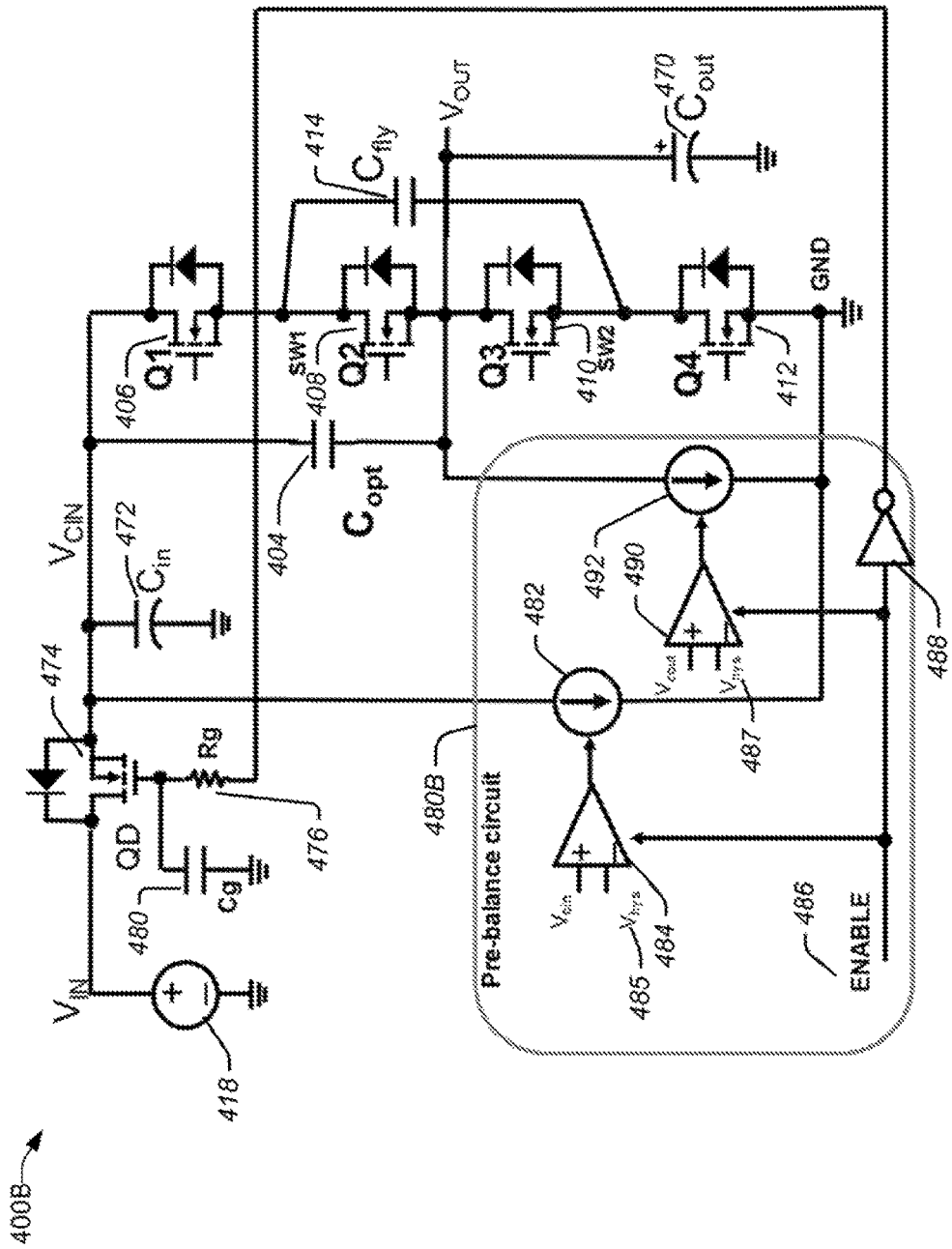
FIG. 4B is a switched capacitor converter circuit configured as a divider that is coupled to a pre-balance circuit, consistent with an illustrative embodiment.

While FIG. 4A includes a switched capacitor converter that is configured as a multiplier, it will be understood that a divider can be implemented as well. To that end, reference now is made to FIG. 4B, which is a switched capacitor converter circuit configured as a divider that is coupled to a pre-balance circuit 480B, consistent with an illustrative embodiment. Many of the components of the architecture 400B are similar to those of architecture 400A, and therefore not repeated here for brevity.

The pre-balance circuit 480B includes two separate current sources 482 and 492 that are operative to control the charge of the output node $V_{CIN}$ (across 472) and the voltage across the output $V_{OUT}$, respectively. Each current source 482, and 492 is controlled by its corresponding comparator 484 and 490, respectively. Comparator 484 compares the voltage across $V_{CIN}$ to a first hysteresis voltage $V_{HYS}$ 485. For example, when the voltage across $V_{CIN}$ exceeds the tolerance provided by the hysteresis voltage $V_{HYS}$ 485, then the comparator 484 triggers the current source 482 to reduce the charge across $C_{IN}$ 472. In this way, the voltage across the input capacitor $C_{IN}$ 472 is maintained within a predetermined tolerance. The actual current of each current source 482 and 492 is chosen to prevent large inrush from or to the transistors Q1 to Q4 (406 to 412) to prevent reliability degradation of the same.

Similarly, the voltage across capacitor $C_{OUT}$ 470 is maintained by the current source 492. The comparator 490 compares the voltage across the output capacitor $C_{OUT}$ 470 to a second hysteresis voltage $V_{HYS}$ 487. In one embodiment, the second hysteresis voltage 487 is identical to that of the first hysteresis voltage 485. When the voltage across the output capacitor $C_{OUT}$ 470 exceeds the tolerance provided by the second hysteresis voltage $V_{HYS}$ 487, then the comparator 490 triggers the current source 492 to reduce the charge across the output capacitor $C_{OUT}$ 470, thereby maintaining the voltage across the output capacitor $C_{OUT}$ 470 within a predetermined tolerance.

In one embodiment, a transistor QD 474 is included between the input 418 and the input capacitor $C_{IN}$ 472. The gate of the transistor QD 474 is coupled to an enable signal 486 (e.g., via an inverter 488). In one embodiment, a resistance element Rg 476 is coupled between the gate of the transistor QD 474 and the enable signal (e.g., via the inverter 488). Further, there is a capacitor Cg 480 coupled between the gate and GND. Accordingly, the RC time constant of the capacitor 480 and the resistance element Rg 476 provide a time constant, thereby creating a ramped input across the input capacitor $C_{IN}$ 472.

Figure 5:
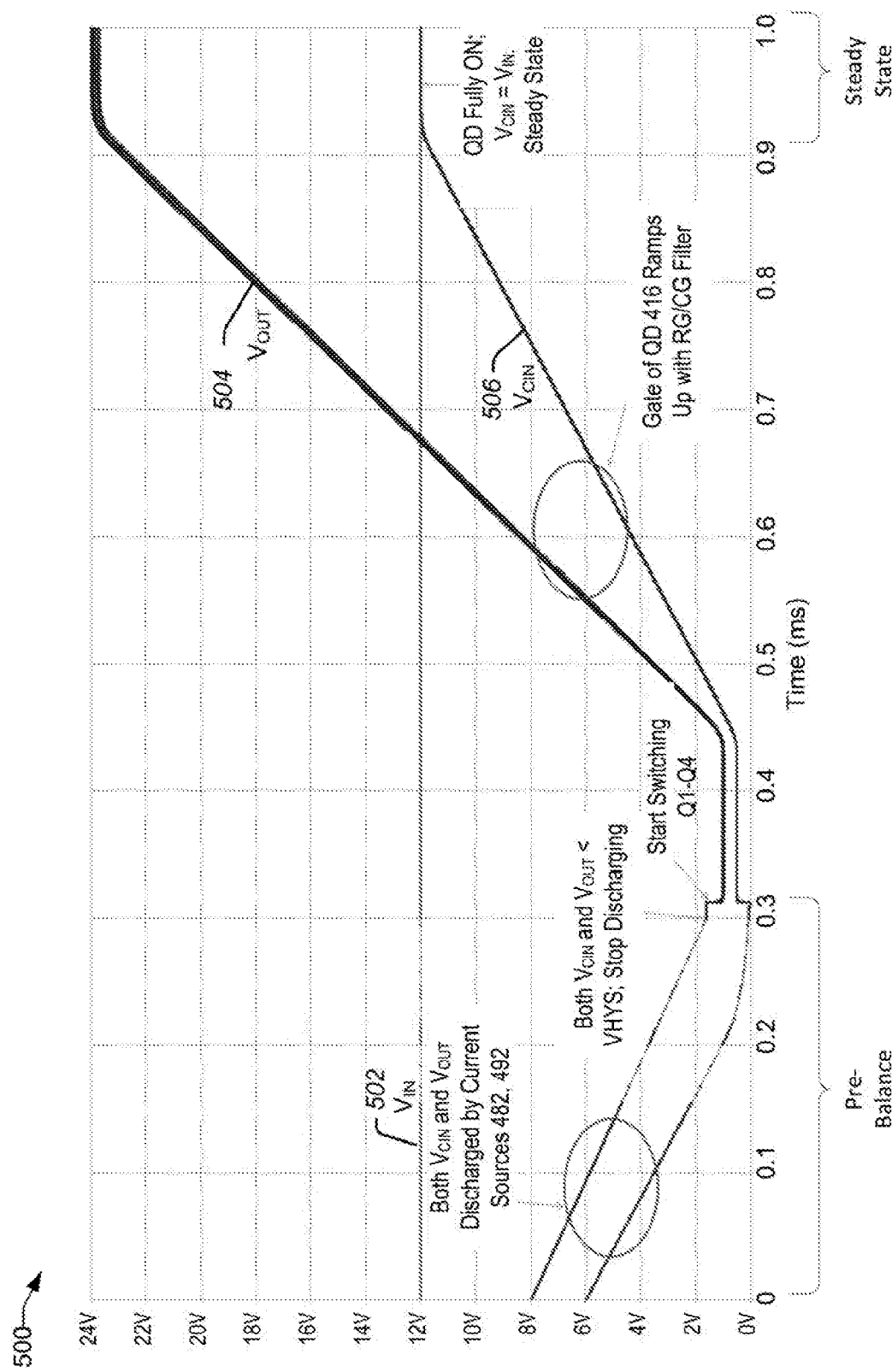
FIG. 5 is an example timing graph of the switched capacitor converter circuit of FIG. 4A.

The switched capacitor converter circuit 400A may be better understood in view of FIG. 5, which is an example timing graph 500 thereof. An overall objective of the pre-balance circuit 480A is to assure that the voltage across the output capacitor $C_{OUT}$ 428 (i.e., $V_{OUT}$) and the input capacitor $C_{IN}$ 424 (sometimes referred to herein as $V_{CIN}$) are similar to each other when the switched capacitor converter of FIG. 4A is in transient state. The switching transistors Q1 to Q4 (406 to 412) can then be activated to provide the proper relationship between the output voltage $V_{OUT}$ and the input voltage $V_{IN}$ 418. To that end, by way of example, FIG. 5 provides example simulation results of the circuit of FIG. 4A.

By way of example, $V_{IN}$ 418 is at 12V, as illustrated by waveform 502. Initially, there is a difference between $V_{OUT}$ (504) and $V_{CIN}$ (506) that is above the threshold provided by the hysteresis voltage (485). Accordingly, during pre-balance, comparators 484 and 490 instruct their corresponding current sources 482 and 492 to discharge $V_{OUT}$ and $V_{CIN}$, as indicated by waveforms 504 and 506 between time 0 to and 0.32 ms. Thus, both $V_{CIN}$ and $V_{OUT}$ are discharged by current sources 482 and 490 until time 0.32 ms, where both $V_{CIN}$ and $V_{OUT}$ reach a level that is below the hysteresis voltage.

After a pre-balance, transistors Q1-Q4 begin switching, the input "disconnect" switch 416 is then turned ON via an enable signal 486. Put differently, upon both $V_{OUT}$ and $V_{IN}$ being within the hysteresis voltage (i.e., at 0.32 ms) then the switches Q1 to Q4 (406 to 412) can begin switching in order to achieve the desired output voltage $V_{OUT}$ with respect to the input voltage $V_{IN}$ (502). In this regard, a transistor QD 416 is ramped up gradually to provide a path between $V_{IN}$ 418 and the voltage across capacitor $C_{IN}$ 424 (i.e., referred to herein as $V_{CIN}$). The rate of the ramp is provided by the time constant between capacitor Cg 422 and resistance element Rg, which together act as a filter that is coupled to the gate of the transistor QD.

Thus, the capacitance Cg 422 and resistance Rg 420 create a time constant that prevents a fast turn ON of the transistor 416. Since the supply is a slow ramp relative to the switching frequency of transistors Q1 to Q4 (406 to 412), the voltage difference between the voltage across the capacitor $C_{FLY}$ 414 (i.e., $V_{CFLY}$), voltage across the input capacitor $C_{IN}$ 424 (i.e., $V_{CIN}$), and fractional voltage across the output capacitor $C_{OUT}$ 428 (i.e., $V_{COUT}/2$) is small, which prevents large inrush currents. The output voltage $V_{OUT}$, exhibits a slow ramp that tracks the input supply ramp.

Accordingly, after the time constant, the transistor QD 416 is fully ON and the voltage $V_{CIN}$ is substantially similar to $V_{IN}$, as indicated by waveform 506 after 0.9 ms. The transistor QD 416 being fully ON marks the steady state condition of the switched capacitor converter circuit of FIG. 4A. Due to the duty cycle (e.g., 50%) of transistors Q1 to Q4 (406 to 412), the switched capacitor converter circuit acts as a voltage doubler, thereby providing an output voltage of 24V with respect to an input voltage of 12V. Of course, other voltages can be achieved with different duty cycles of the transistors Q1 to Q4 (406 to 412).

In some embodiments, an optional capacitor $C_{OPT}$ 404 is added between the input (i.e., at the positive terminal of the input capacitor $C_{IN}$ 424) and the output (i.e., $V_{OUT}$ node) of the charge pump circuit to improve the power efficiency. In this regard, it should be noted that while some figures do not explicitly show the optional capacitor $C_{OPT}$ 404 to avoid clutter, the pre-balance circuits discussed herein can operate with or without the optional capacitor $C_{OPT}$ 404.

The current sources 482 and 492 (as well as other current sources used in the pre-balance circuits discussed herein) may be implemented in different ways, such as by way of linear regulators and/or switching regulators. In various embodiments, these current sources may be inside the integrated circuit (IC) or implemented using external discrete components.

In one embodiment, the current sources used to pull down and discharge the capacitors discussed herein may be implemented with active devices such as NPN, PNP, NMOS, PMOS, JFET, and the like, or may be as simple as a resistance element. Accordingly, the current sources discussed herein are not limited to a particular technology or configuration, and may be implemented based on the particular application. It is believed that those skilled in the art are familiar with such topologies and devices, and they are therefore not discussed here for brevity.

In one embodiment, the current sources 482 and 492 (as well as other current sources used in the pre-balance circuits discussed in other figures) are implemented using the transistors Q1 to Q4 (e.g., 406 to 412). For example, by virtue of slowly turning ON transistor Q3 410, the transistor Q3 410 can source current to node SW2. By slowly turning ON transistor Q4 412, the transistor Q4 412 can sink current from node SW2 to GND. As used herein, the term "slowly turning ON" refers to controlling the gate to source voltage of the transistors such that the current through the transistors (e.g., drain to source) does not exceed the maximum operation current.

Further, transistors Q3 410 and Q4 412 together can perform the function of the current source $I_{SW2}$ 262 as illustrated in FIG. 2. In various embodiments, the pre-balance circuits discussed herein also can operate if any of the transistors Q1 to Q4 (406 to 412) are implemented with positive channel metal oxide semiconductors (PMOS).

Example Driving of the Switching Transistors

Figure 6:
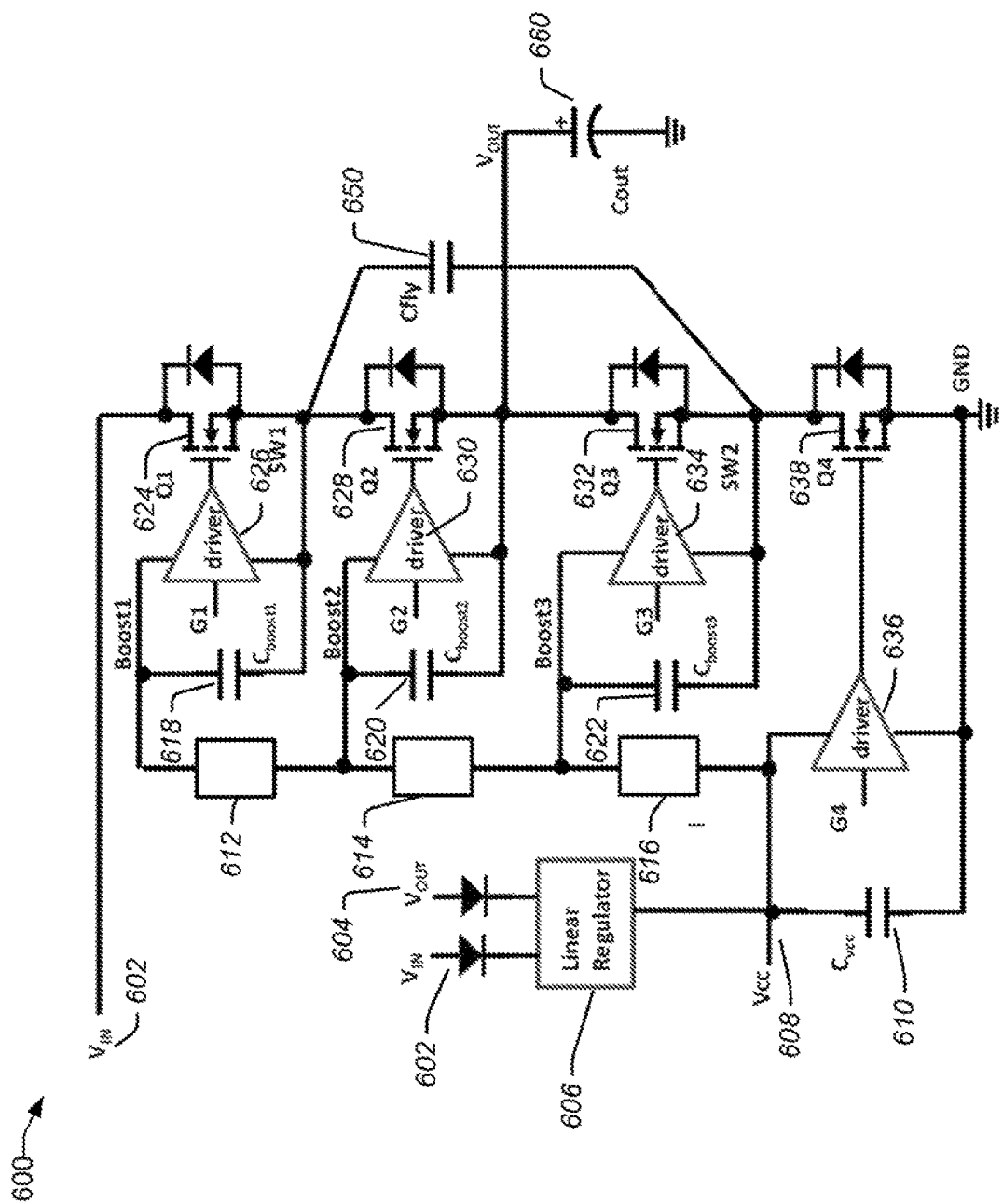
FIG. 6 illustrates the control of the switches of a switched capacitor converter circuit, consistent with an exemplary embodiment.

Reference now is made to FIG. 6, which illustrates the control of the switches (i.e., transistors) of a switched capacitor converter circuit, consistent with an exemplary embodiment. In some implementations, particularly in the use of high current and/or voltage charge pumps, transistors Q1 to Q4 (624, 628, 632, and 638) may be implemented using negative channel metal oxide semiconductor (NMOS) field effect transistors, due to their low ON resistance, to provide a higher power efficiency for the charge pump. To provide gate driver voltage for turning ON and OFF transistors Q1 to Q4 (624, 628, 632, and 638) different floating voltage supplies may be used for drivers 626, 630, 634, and 636, respectively. To that end, FIG. 6 illustrates an example circuit 600 that generates several (i.e., four driver voltages) from a single voltage supply $V_{CC}$, which may be provided by a linear regulator 606. This circuit 600 may simplify system design, reduce system cost, and enhance reliability of the switched capacitor converter circuit. While four driver voltage stages are illustrated by way of example, it will be understood that additional or fewer voltage stages can be implemented in view of the teachings herein.

To better appreciate the architecture of FIG. 6, it should be noted that in conventional switched capacitor converter circuits 100, during transient state such as power-up, the voltages on the chip are not predictable because the voltages may not have been fully developed. Accordingly, transistors Q1 to Q4 (106 to 112) may not be predictably controlled via their gate to source voltages. In this regard, applicants have developed an effective way of driving (controlling) transistors Q1 to Q4 (624, 628, 632, and 638) of the switched capacitor converter with the floating driver topology of FIG. 6, which is described in detail below.

As illustrated in FIG. 6, there are several drivers that may be operated at different supply voltages. For example, driver 636 has supplies between $V_{CC}$ and GND, whereas drivers that are stacked higher (e.g., drivers 634, 630, and 626) are operated at different supply voltages. Since an upper driver is supplied by a lower driver, only when the lower driver is ready, are the upper driver capacitors (Cboost3 622, Cboost2, 620, and Cboost1 618) charged, respectively. For example, during steady state operation, voltage node $V_{CC}$ 608 provides the supply voltage to the driver 636 for the bottom transistor Q4 638 (e.g., N channel MOSFET) directly. Since the source of the transistor Q4 638 and driver 636 is directly coupled to ground, the voltage provided by the driver 636 is generally enough to overcome the threshold voltage, as applied between the gate to source of transistor Q4 638, thereby being able to control the transistor Q4 638 (i.e., turn OFF and ON) even during transient state.

In various embodiments, the actual voltage for the Vcc node 608 could be supplied from an external bias or through a linear regulator 606 that receives its input from nodes $V_{IN}$ 602 and/or $V_{OUT}$ 604. Unidirectional pass circuits 612 to 616 perform the function of allowing current to pass in a first direction (i.e., away from $V_{CC}$ 608) but not in a second direction (i.e., towards $V_{CC}$ 608). In various embodiments, each unidirectional pass circuit 612 to 616 can be implemented as a diode or as a charge pump (which may be external). The use of internal diodes reduces circuit complexity and cost. In one embodiment, diodes D1 to D3 (612 to 616) are Schottky diodes, which may be used for their lower threshold voltage. For example, while a silicon diode has a typical forward voltage of 600-700 mV, the Schottky's forward voltage is only 150-450 mV. This lower forward voltage provides more headroom as the number of diodes are stacked in series and better system efficiency, making a unidirectional pass circuit closer to an ideal diode. In some embodiments, the three diodes (612 to 616) may be implemented with positive channel metal oxide semiconductor (PMOS) transistors and may be integrated inside the chip to further reduce the size and space of the circuit 600. For example, diodes 612 to 616 together with transistors Q1 to Q4 (624, 628, 632, and 638) form three "mini" charge pump circuits that are configured to generate the supply voltages for the drivers 626, 630, and 634 of transistors Q1 624, Q2 628, and Q3 632, respectively.

The Boost3 node driver voltage is supplied by the Vcc 608 through diode 622 when transistor Q4 638 is ON. In one embodiment, the Boost2 node driver voltage is supplied from the Boost3 node through diode 620 when transistor Q3 632 is ON. The Boost1 node driver voltage is supplied from the node Boost2 through diode 612 when transistor Q2 628 is ON. Three capacitors Cboost1 618, Cboost2 620, and Cboost3 622 serve as energy storage components when transistors Q2 630, Q3 632, and Q4 638 are OFF, respectively. It should be noted that, as used herein, the term "ON" with respect to transistors Q1 to Q4 includes the meaning that a voltage between the gate to source of the transistor is applied to create an effective short between the drain and source of the transistor. Similarly, the term "OFF" includes the meaning that an appropriate voltage is applied to the gate to source of the transistor such that there is an effective open between the drain and source of the transistor.

Figure 7:
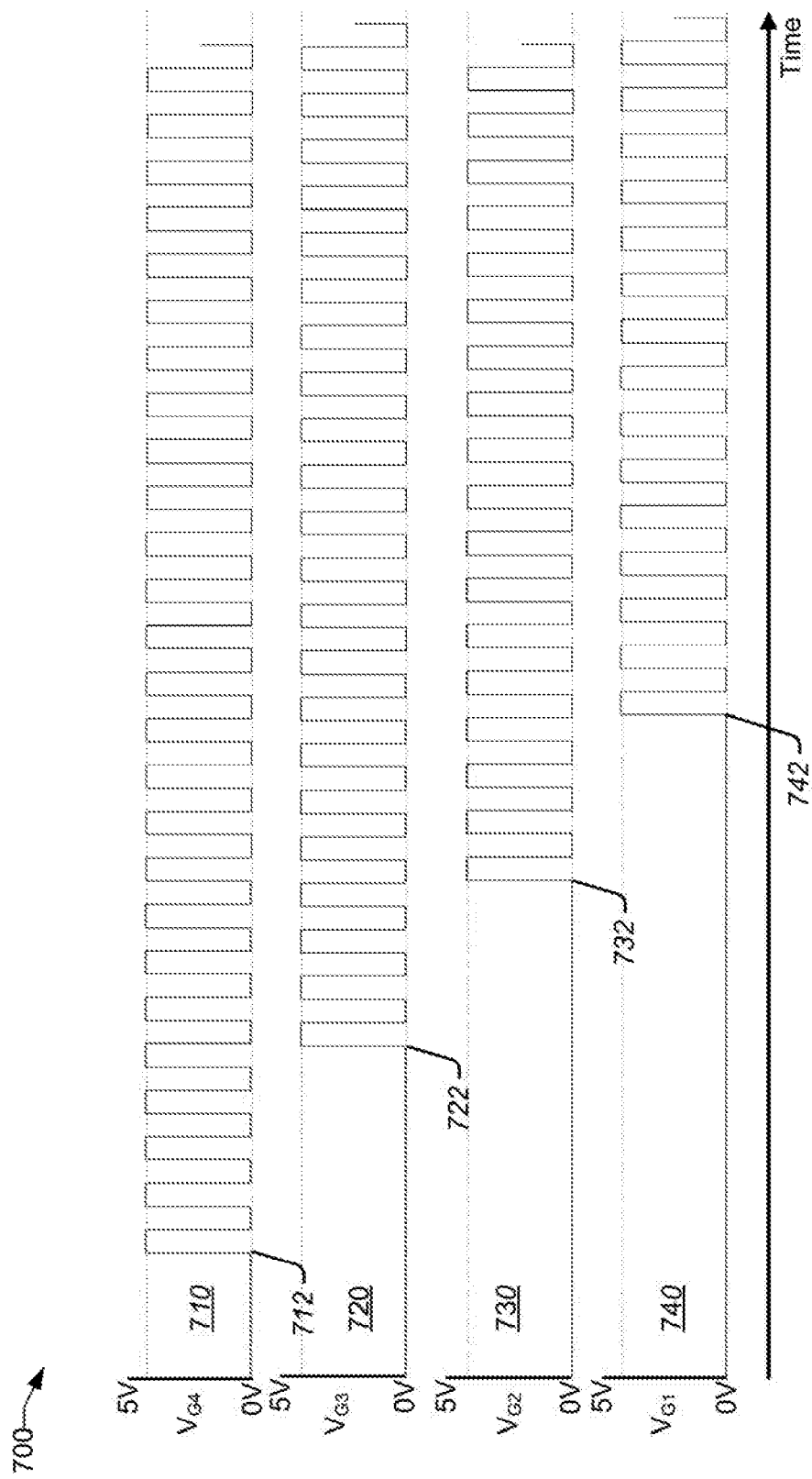
FIG. 7 is an example timing diagram for the drivers of the switched capacitor converter circuit of FIG. 6.

FIG. 7 is an example timing diagram for the drivers of the switched capacitor converter circuit of FIG. 6. Waveform 710 represents the voltage from input G4 to GND as applied to driver 636 (sometimes referred to herein as the first driver); waveform 720 represents the voltage from input G3 to node SW2 as applied to driver 634 (sometimes referred to herein as the second driver); waveform 730 represents the voltage from input G2 to node $V_{OUT}$ as applied to driver 630 (sometimes referred to herein as the third driver); and waveform 740 represents the voltage from input G1 to node SW1, as applied to driver 626, (sometimes referred to herein as the fourth driver).

As discussed previously, the voltage level $V_{CC}$ 608 may be provided by an external source or via a linear regulator 606 based on the Input voltage 602 and the output voltage 604. The system waits until $V_{CC}$ 602 is ready (i.e., represented by point 712). Only then does driver 636 receive a high signal to turn ON transistor Q4 638. In this regard, transistor Q4 638 creates a path between SW2 and GND, while transistors Q1, Q2, and Q3 (624, 628, and 632) are kept OFF.

When transistor Q4 is ON, the voltage across capacitor Cboost3 622 is charged up to 4.7V (assuming a 0.3V voltage drop of the Schottky diode D3 616), if the initial condition of the voltage across capacitor Cboost3 622 voltage is zero or very low. Assuming the voltage across capacitor Cboost3 622 is large and its leakage current is small, the capacitor Cboost3 will hold the voltage between Boost3 and SW2, sometimes referred to herein as the voltage across the Cboost3 capacitor 622, at 4.7V. The 4.7V is used as a power supply for the driver 634.

Subsequently, after one or more cycles to allow the voltage across capacitor Cboost3 622 to settle, transistor Q4 638 is turned OFF, transistor Q3 632 is turned ON, and transistors Q1 and Q2 (626 and 628) are kept OFF as indicated by point 722 in FIG. 7. Thus, driver G3 634 receives a high signal to turn ON transistor Q3 634. In this regard, the transistor Q3 creates a path between the $V_{OUT}$ node and the SW2 node (i.e., SW2 is shorted to $V_{OUT}$). Accordingly, the voltage at node Boost3 is provided by equation 13 below:

$$V_{BOOST3} = V_{OUT} + V_{Cboost3} \quad \text{(EQ. 13)}$$
$$= V_{OUT} + 4.7\,\text{V}$$

Regarding the voltage across capacitor Cboost2 620, it is charged via the diode 614. For example, if the initial voltage across the capacitor Cboost2 620 is low (e.g. 1V), Cboost2 620 is charged up to 4.4V by Cboost3 through the diode 614 because the voltage at the node $V_{BOOST3}$=(4.7V+Vout) is higher than the voltage at node Boost2, as provided by equation 14 below:

$$V_{BOOST2} = V_{OUT} + V_{Cboost2} \quad \text{(EQ. 14)}$$
$$= V_{OUT} + 1\,\text{V}$$

Accordingly, diode 614 conducts charge current. Assuming that the voltage across capacitor Cboost2 620 is also large and leakage current is small, the voltage across capacitor Cboost2 holds 4.4V (e.g., assuming a voltage drop of 0.3V for the Schottky diode 620) between node Boost2 and $V_{OUT}$, which is a sufficient voltage to operate driver 630.

Subsequently, after one or more cycles to allow the voltage across capacitor Cboost2 620 to settle, at time 732, transistor Q2 628 is turned ON (while transistor Q1 624 remains OFF). Thus, driver G2 630 receives a high signal to turn ON transistor Q2 628, thereby shorting node SW1 to $V_{OUT}$. Assuming that the initial voltage across capacitor Cboost1 618 is low (e.g. 2V), now the voltage at node Boost1 is provided by equation 15 below:

$$V_{BOOST1} = V_{OUT} + V_{Cboost1} \quad \text{(EQ. 15)}$$
$$= V_{OUT} + 2\,\text{V}$$

Since the voltage at node Boost2 (Vout+4.4V) is higher than the voltage at node Boost1 (Vout+2V), the capacitor Cboost1 618 is charged up to 4.1V through the diode 612. The same process can be used to initiate the driver G1 626 after waiting one or more cycles for the voltage across capacitor Cboost 1 618 to settle (e.g., at time 742). Indeed, the above process can be repeated for all floating drivers such that all drivers are sufficiently supplied (e.g., charged) to be able to control their corresponding transistor of the switched capacitor converter circuit.

Figure 8:
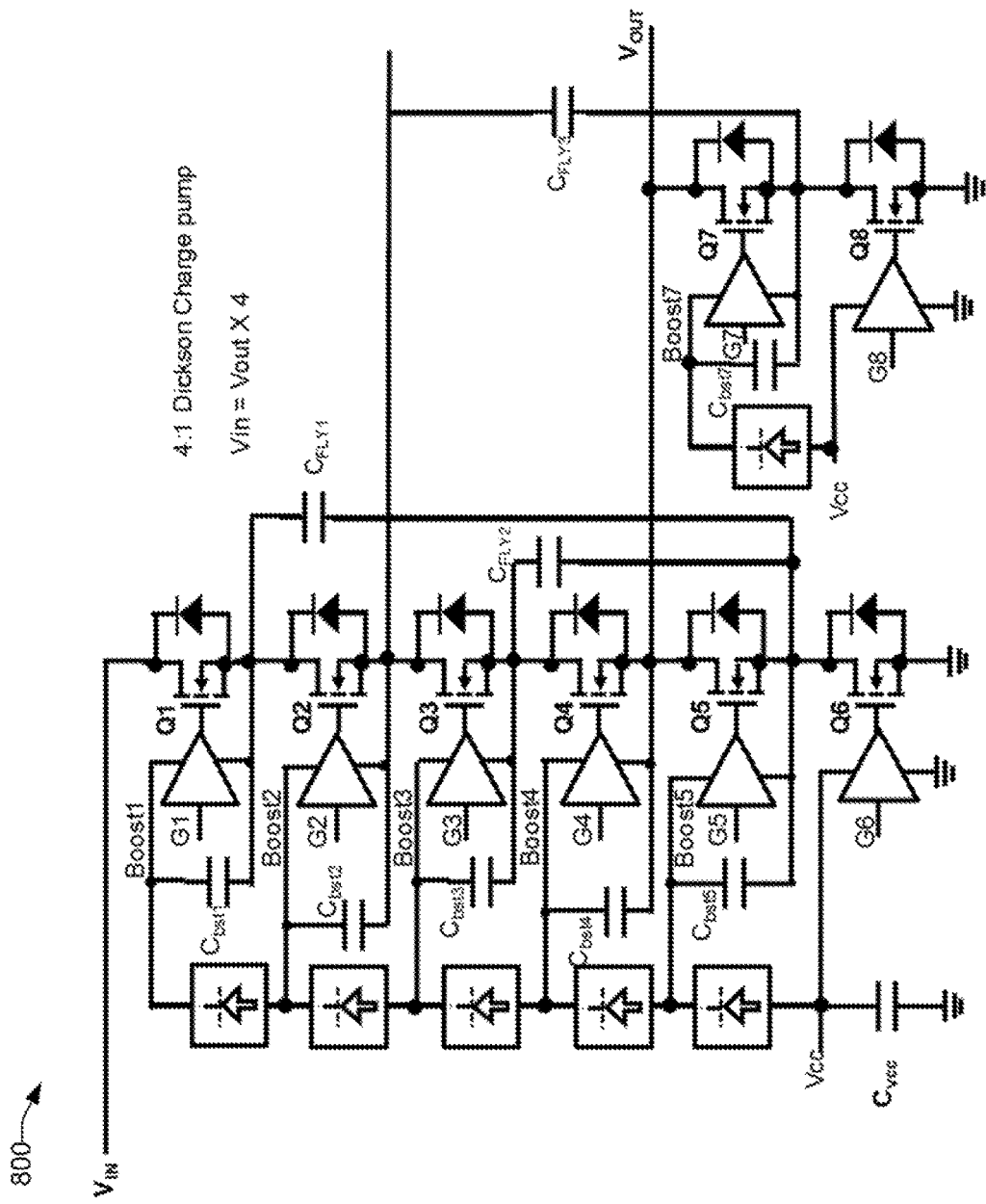
FIG. 8 illustrates an example Dickson charge pump that uses the floating driver concept.

While one type of charge pump has been described in the examples above, based on the concepts discussed herein, other types of charge pumps, such as Dickson, series-parallel, ladder, etc., where MOSFETs are stacked to be driven with floating drivers, can be driven by the floating driver concept discussed herein. In this regard, FIG. 8 illustrates an example Dickson charge pump 800 that uses the floating driver concept. Accordingly, for each switching transistor of the converter (i.e., Q1 to Q6), except for the last stage (e.g., Q6), power is from the bottom two drivers and stacked up with a control logic for the corresponding upper transistors, as discussed in the context of FIG. 6. By way of example, and not by way of limitation, six switching transistors Q1 to Q6 are illustrated in FIG. 8, while it will be understood that different number of stages are supported as well. Based on the topology of the example Dickson charge pump 800, an output voltage $V_{OUT}$ is provided that is a multiple of 4 of the input voltage $V_{IN}$. The driving of each switching transistor Q1 to Q6 is substantially similar to that of FIG. 6 and therefore not repeated here for brevity.

Figure 9:
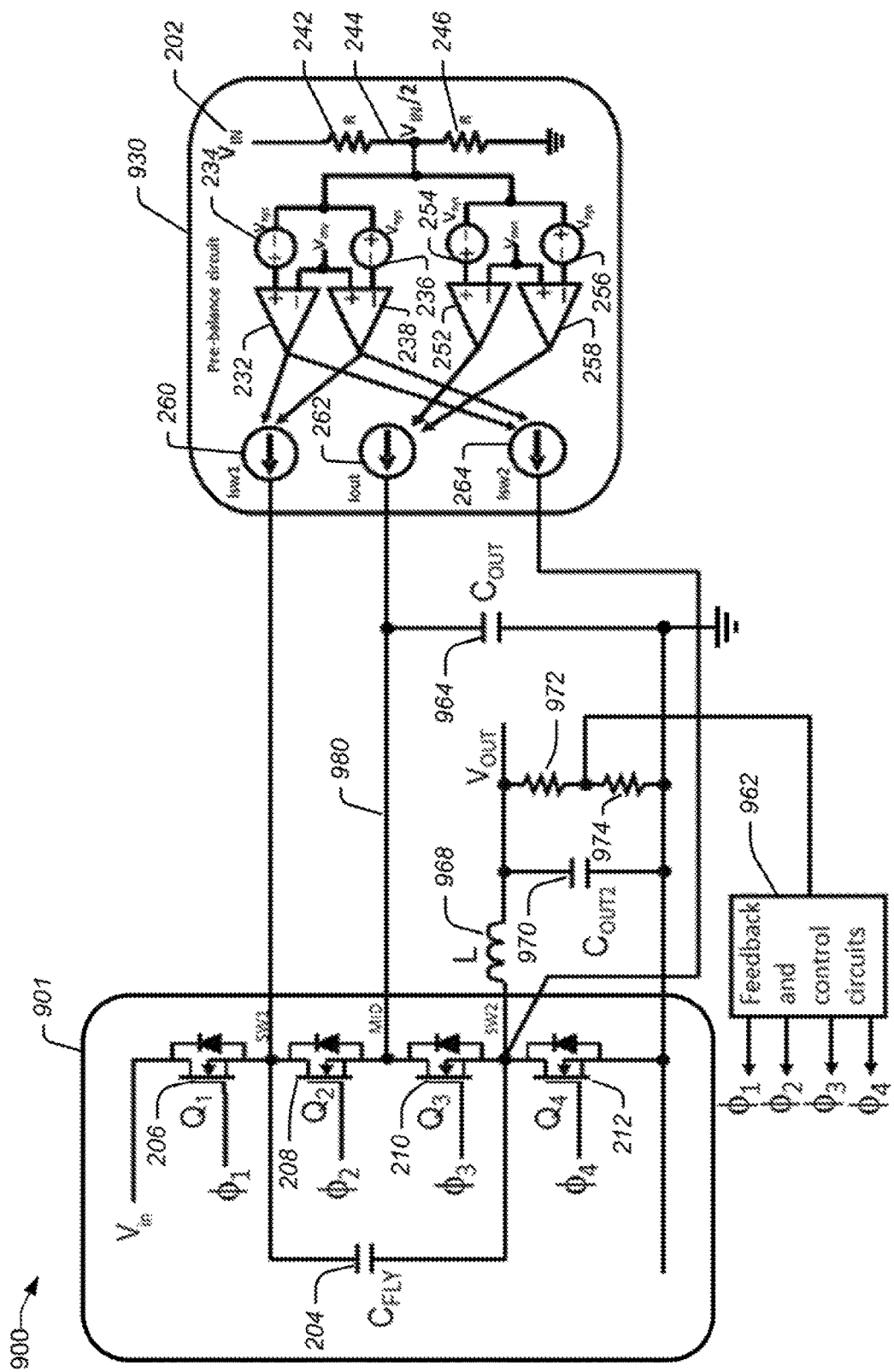
FIG. 9 is a switched capacitor converter circuit with a buck topology that is coupled to a pre-balance circuit, consistent with an illustrative embodiment.

Still further, the concepts discussed herein can be used together with various types of DC to DC voltage converters, such as buck, boost, and buck-boost. To that end, FIG. 9 illustrates by way of illustrative example a switched capacitor converter circuit 901 with a buck topology that is coupled to a pre-balance circuit 930, consistent with an exemplary embodiment. The pre-balance circuit 930 is substantially similar to the pre-balance circuit 230 of FIG. 2. Similarly, the switched capacitor converter circuit 901 is substantially similar to the switched capacitor converter circuit 201 of FIG. 2. These blocks are therefore not repeated here for brevity.

The architecture 900 includes an output capacitor $C_{OUT}$ 964 that is coupled between node 980 and GND. There is an inductor L 968 coupled between node SW2 and the output node $V_{OUT}$. There is a second capacitor $C_{OUT2}$ 970 coupled between $V_{OUT}$ and GND. There are two resistance elements 972 and 974 coupled in series between $V_{OUT}$ and GND. There is a feedback and control circuit 962 coupled to the interface between the first resistance element 972 and the second resistance element 974.

In one embodiment, by setting the amplitude of current sources Isw1 260 and Isw2 264 to be substantially similar, the hybrid buck converter is allowed to startup into a pre-biased output condition without charging or discharging the output voltage $V_{OUT}$.

CONCLUSION

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently.

For example, any signal discussed herein may be scaled, buffered, scaled and buffered, converted to another mode (e.g., voltage, current, charge, time, etc.), or converted to another state (e.g., from HIGH to LOW and LOW to HIGH) without materially changing the underlying control method.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently. For example, bipolar transistors (e.g., PNP or NPN) or junction gate field-effect transistors (JFET) can be used instead of MOS transistors. A PNP may be used instead of NPN, and a PMOS may be used instead of NMOS.

Unless otherwise stated, all measurements, values, ratings, positions, magnitudes, sizes, and other specifications that are set forth in this specification, are approximate, not exact. They are intended to have a reasonable range that is consistent with the functions to which they relate and with what is customary in the art to which they pertain.

Except as stated immediately above, nothing that has been stated or illustrated is intended or should be interpreted to cause a dedication of any component, step, feature, object, benefit, advantage, or equivalent to the public, regardless of whether it is or is not recited in the claims.

All articles, patents, patent applications, and other publications that have been cited in this disclosure are incorporated herein by reference.

It will be understood that the terms and expressions used herein have the ordinary meaning as is accorded to such terms and expressions with respect to their corresponding respective areas of inquiry and study except where specific meanings have otherwise been set forth herein. Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of pre-balancing a switched capacitor converter having a plurality of switches coupled in series, an input capacitor, an output capacitor, and a flying capacitor, the method comprising:
   comparing a voltage across the output capacitor to a first hysteresis voltage;
   upon determining that the voltage across the output capacitor is above a tolerance provided by the first hysteresis voltage, discharging the output capacitor via a first current source;
   comparing a voltage across the input capacitor to a second hysteresis voltage; and
   upon determining that the voltage across the input capacitor is above a tolerance provided by the second hysteresis voltage, discharging the input capacitor via a second current source.

2. The method of claim 1, wherein the first and second hysteresis voltages are equal in magnitude.

3. The method of claim 1, further comprising:
   keeping a pass switch between an input node and the input capacitor of the switched capacitor converter off while the input capacitor or the output capacitor is discharged; and
   turning the pass switch on after the input capacitor and the output capacitor have been discharged to respective threshold levels.

4. The method of claim 3, further comprising, upon completing the discharge of the input capacitor and the output capacitor to respective threshold levels, providing a soft start for the switched capacitor converter by initiating a switching of the plurality of switches followed by a ramp up of an input voltage provided to the plurality of switches and the input capacitor from an input power supply.

5. The method of claim 4, wherein the ramp up of the input voltage comprises:
   gradually switching on the pass switch according to a predetermined time constant provided by a capacitor and resistance element coupled to a gate of the pass switch.

6. The method of claim 1, further comprising:
   discharging the flying capacitor via an effective body diode between each drain to source of first to third switches of the plurality of switches coupled in series.

7. A pre-balancing circuit for pre-balancing a switched capacitor converter, comprising:
   one or more comparator circuits, each configured to monitor charge of a respective capacitor of the switched capacitor converter and generate a pre-balance signal when the charge of the respective capacitor exceeds a threshold charge during a pre-balance phase of the switched capacitor converter; and
   one or more current sources configured to reduce the charge on capacitors of the switched capacitor converter to a charge level below the threshold charge in response to receiving the pre-balance signal from the one or more comparator circuits.

8. The pre-balancing circuit of claim 7, wherein the one or more comparator circuits comprise:
   a first comparator circuit connected to a first current source of the one or more current sources, the first comparator being configured to monitor a first voltage of an output capacitor of the switched capacitor converter, compare the first voltage to a first reference voltage, and to initiate activation of the first current source when the first voltage exceeds the first reference voltage; and
   a second comparator circuit connected to a second current source of the one or more current sources, the second comparator being configured to monitor a second voltage of an input capacitor of the switched capacitor converter, compare the second voltage to a second reference voltage, and to initiate activation of the second current source when the second voltage exceeds the second reference voltage.

9. The pre-balancing circuit of claim 8, wherein:
   the first current source is coupled to the output capacitor, and the second current source is coupled to the input capacitor;
   the first comparator circuit comprises:
   a first input configured to receive the first voltage of the output capacitor;
   a second input configured to receive the first reference voltage;
   an enable input operative to receive an enable signal to enable the first comparator to monitor charge; and
   a first current source control output configured to provide to the first current source a first pre-balance signal to initiate activation of the first current source to discharge the output capacitor upon determining that the received first voltage is above a first threshold represented by the first reference voltage;
   the second comparator circuit comprises:
   first input configured to receive the second voltage of the input capacitor of the switched capacitor converter;
   a second input configured to receive the second reference voltage;
   an enable input operative to receive the enable signal to enable the second comparator to monitor charge; and
   a second current source control output configured to provide to the second current source a second pre-balance signal to initiate activation of the second current source to discharge the input capacitor upon determining that the received second voltage is above a second threshold represented by the second reference voltage.

10. The circuit of claim 1, wherein the first and second reference voltages are equal in magnitude.

11. The circuit of claim 1, wherein the switched capacitor converter is configured as a voltage-multiplier converter.

12. The circuit of claim 1, further comprising an input supply disconnect switch coupled between a plurality of switches of the switched capacitor converter and an input power supply, the input supply disconnect switch being controlled by the enable signal such that the input supply disconnect switch disconnects the input power supply from the plurality of switches when receiving the enable signal in a second state.

13. The circuit of claim 12, wherein each of the plurality of switches and the input supply disconnect switch is a transistor having a gate that is coupled to a circuit providing the enable signal.

14. The circuit of claim 13, wherein at least the input supply disconnect switch is an N-channel metal oxide field effect transistor (NFET).

15. The circuit of claim 13, further comprising:
a third capacitor coupled between the gate of the input supply disconnect switch and a ground; and
a resistance element coupled between the gate of the input supply disconnect switch and the circuit providing the enable signal.

16. The circuit of claim 15, wherein the third capacitor and the resistance element are configured to provide a time constant for turning on the input supply disconnect switch responsive to receiving the enable signal in the second state such that the input supply disconnect switch is turned on at a rate determined by the time constant to provide a ramped voltage from the input power supply to the plurality of switches.

17. The circuit of claim 16, wherein, upon the output capacitor and the input capacitor being discharged to respective threshold charge levels, the plurality of switches are switched according to a switching scheme and the input supply disconnect switch is turned on at the rate determined by the time constant to provide a soft start of the switched capacitor converter after the pre-balancing of the switched capacitor converter has completed.

18. The circuit of claim 17, wherein the enable signal is asserted in the second state to create the ramped voltage after the plurality of switches are switched for a period of time.

19. The circuit of claim 1, wherein the switched capacitor converter comprises:
four switches coupled in series between the output capacitor and a ground; and
a flying capacitor coupled between a source of a first switch of the four switches and a source of a third switch of the four switches, wherein a drain of the third switch of the four switches and a source of a second switch are coupled to the second current source.

20. The circuit of claim 19, wherein the flying capacitor is configured to be discharged via body diodes between each drain to source of the first to third switches of the four switches coupled in series.

21. The circuit of claim 19, further comprising a third capacitor coupled between the input capacitor and the output capacitor.

22. A pre-balancing circuit for a switched capacitor converter, comprising:
means for determining whether a first voltage across an output capacitor of the switched capacitor converter is above a first threshold provided by a first reference voltage;
means for, upon determining that the voltage across the output capacitor is above the first threshold, initiating a discharge of the output capacitor using a first current source;
means for determining whether a second voltage across an input capacitor of the switched capacitor converter is above a second threshold provided by a second reference voltage;
means for, upon determining that the second voltage across the input capacitor is above the second threshold, initiating a discharge of the input capacitor using a second current source.

23. The pre-balancing circuit of claim 22, further comprising:
means for disconnecting the switched capacitor converter from an input power supply- while the output capacitor is discharged using the first current source or the input capacitor is discharged using the second current source; and
means for reconnecting the switched capacitor converter to the input power supply after the input capacitor and the output capacitor have been discharged to respective threshold levels.

24. The pre-balancing circuit of claim 23, further comprising:
means for initiating switching operations of the switched capacitor converter to generate an output power of the switched capacitor converter after the input capacitor and the output capacitor have been discharged to respective threshold levels; and
means for, after the switched capacitor converter is reconnected to the input power supply, ramping up an input voltage provided to the switched capacitor converter by the input power supply.

* * * * *